US008903919B2

(12) United States Patent
Wilcox

(10) Patent No.: US 8,903,919 B2
(45) Date of Patent: Dec. 2, 2014

(54) DYNAMIC INTEGRATION OF APPLICATION INPUT AND OUTPUT IN AN INSTANT MESSAGING/CHAT SESSION

(75) Inventor: Eric M. Wilcox, Winchester, MA (US)

(73) Assignee: International Business Machines Corporation, Armonk, NY (US)

( * ) Notice: Subject to any disclaimer, the term of this patent is extended or adjusted under 35 U.S.C. 154(b) by 1973 days.

(21) Appl. No.: 10/941,677

(22) Filed: Sep. 14, 2004

(65) Prior Publication Data

US 2006/0059237 A1 Mar. 16, 2006

(51) Int. Cl.
*G06F 15/16* (2006.01)
*H04L 12/58* (2006.01)
*H04L 12/18* (2006.01)

(52) U.S. Cl.
CPC ............ *H04L 12/581* (2013.01); *H04L 12/587* (2013.01); *H04L 51/04* (2013.01); *H04L 12/1813* (2013.01)
USPC ....................................................... 709/206

(58) Field of Classification Search
USPC ............... 715/758, 760, 761, 733; 379/88.14, 379/88.22; 345/594, 650, 689; 707/10
See application file for complete search history.

(56) References Cited

U.S. PATENT DOCUMENTS

| 6,430,602 | B1 | 8/2002 | Kay et al. | |
| 7,310,659 | B1 * | 12/2007 | George | 709/206 |
| 7,512,217 | B2 * | 3/2009 | Greenwood | 379/88.14 |
| 7,761,898 | B2 * | 7/2010 | Caspi et al. | 725/82 |
| 2002/0073236 | A1 * | 6/2002 | Helgeson et al. | 709/246 |
| 2002/0091782 | A1 * | 7/2002 | Benninghoff, III | 709/206 |
| 2002/0147823 | A1 * | 10/2002 | Healy | 709/230 |
| 2003/0002633 | A1 * | 1/2003 | Kredo et al. | 379/88.08 |
| 2003/0014617 | A1 * | 1/2003 | Tamboli et al. | 713/1 |
| 2003/0018725 | A1 | 1/2003 | Turner et al. | |
| 2003/0025729 | A1 * | 2/2003 | Davis | 345/753 |
| 2003/0088543 | A1 * | 5/2003 | Skeen et al. | 707/1 |
| 2006/0059237 | A1 * | 3/2006 | Wilcox | 709/206 |
| 2009/0125591 | A1 * | 5/2009 | Kirkpatrick | 709/206 |

* cited by examiner

*Primary Examiner* — Backhean Tiv
(74) *Attorney, Agent, or Firm* — Steven M. Greenberg, Esq.; CRGO Law

(57) ABSTRACT

A method, system and apparatus for integrating dynamic application input and output in an instant messaging/chat system. In this regard, a method for integrating dynamically produced application input and output into instant messaging/chat content in an established instant messaging/chat session can include receiving application input from a remote instant messaging/chat client as a posting to an established instant messaging/chat session and forwarding the received application input to a designated external application. Finally, the application output from the external application can be posted as content in the established instant messaging/chat session. Additionally, the application input can be pre-processed before performing the forwarding step, and the application output can be post-processed before performing the posting step.

17 Claims, 4 Drawing Sheets

DYNAMIC INTEGRATION OF APPLICATION INPUT AND OUTPUT IN AN INSTANT MESSAGING/CHAT SESSION

BACKGROUND OF THE INVENTION

1. Statement of the Technical Field

The present invention relates to the field of collaborative computing and more particularly to instant messaging and chat systems.

2. Description of the Related Art

Real time communications systems provide a substantial enhancement over more traditional, asynchronous communications systems. Electronic mail delivery systems, the prototypical asynchronous communications systems, in its time represented a giant leap forward in respect to global interpersonal communications. Prior to electronic mail, individuals primarily communicated via telephone, facsimile and post. With electronic mail, however, individuals expect near instant delivery of text, and even imagery, audio and video, without incurring the delay typical of the postal system, or the expense associated with telephony and fax technologies.

Despite the ubiquity of electronic mail, asynchronous communications systems lack several elements common in the realm of real time communications systems. In particular, the seemingly instant delivery of a message cannot be experienced in the world of electronic mail. In an real-time society, the minor latencies associated with electronic mail often cannot be suitable for the task at hand where a real-time conversation will be required in addressing a problem or performing a collaborative task. More importantly, often the feel and nature of a "conversation" as it is known to human beings only can be approximated through real time communications where the participants to a conversation feel the spontaneity of an exchange of ideas, much as is the case in a live, face-to-face conversation.

The recent rapid development of the Internet has led to advanced modes of synchronous, real-time collaboration able to fulfill the real-time communicative requirements of the modern computing participant. Using the Internet as a backbone, individuals worldwide can converge in real-time in cyberspace to share ideas, documents and images in a manner not previously possible through conventional telephony and video conferencing. To facilitate collaboration over the Internet, a substantial collection of technologies and protocols have been assembled to effectively deliver audio, video and data over the single data communications medium of the Internet. These technologies include several human-to-human collaborative environments such as instant messaging, application sharing, shared document libraries and persistent chat rooms.

Current instant messaging and chat systems allow users to communicate through a mostly textual interface. Other channels such as voice, video and application sharing often are bundled with an instant messaging tool in a single collaborative system. Notwithstanding, presently, applications output remains separate and non-cooperative. In this regard, interactions with an application can be shared with other collaborators only through application sharing technology. Application sharing technology, however, can require substantial bandwidth as entire images of an application must be broadcast to collaborators over data communications links. Moreover, it can be difficult to extract contextual elements from a shared image of an application in as much as the shared image ordinarily is a singular graphic image.

SUMMARY OF THE INVENTION

The present invention addresses the deficiencies of the art in respect to instant messaging and chat systems and provides a novel and non-obvious method, system and apparatus for integrating dynamic application input and output in an instant messaging/chat system. In this regard, an instant messaging/chat system which has been configured in accordance with the present invention can include an instant messaging/chat client and an application event interface to the instant messaging/chat client. The interface can have a configuration for receiving application input and output and integrating the received application input and output with instant messaging/chat content for an established instant messaging/chat session.

The system of the present invention further can include an instant messaging/chat server configured for communicative coupling to the instant messaging/chat client, the server having logic for determining whether selected other instant messaging/chat clients can process application output in a data format, or whether the selected other instant messaging/chat clients can process only a textual representation of the application output. The instant messaging/chat client also can include logic for attaching an application to the established instant messaging/chat session so as to integrate input and output to and from the application into the instant messaging/chat content.

A method for integrating dynamically produced application input and output into instant messaging/chat content in an established instant messaging/chat session can include receiving application input from a remote instant messaging/chat client as a posting to an established instant messaging/chat session and forwarding the received application input to a designated external application. Finally, the application output from the external application can be posted as content in the established instant messaging/chat session. Additionally, the application input can be pre-processed before performing the forwarding step, and the application output can be post-processed before performing the posting step. The pre-processing and post-processing can be either automatic or manual in nature. For example, the automatic processing can include converting user interface elements to a text-only representation. By comparison, manual processing can include the prevention of subversive calls from reaching the target application.

Preferably, it can be determined which of the participating other instant messaging/chat clients can process the application output in a data format, and which of the participating other instant messaging/chat clients can process the application output only as a textual representation of the application output. As such, the application output can be converted to a textual representation and forwarded to the participating other instant messaging/chat clients which can process the application output only as a textual representation of the application output. Conversely, the application output in the data format can be forwarded to the participating other instant messaging/chat clients which can process the application output in a data format.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for dynamically integrate application output in an instant messaging/chat session. In accordance with the present invention, an application can be logically coupled to an instant messaging/chat session. Participants in the session can provide input commands to the application through the instant messaging/chat clients, and application output can be received in the instant messaging/chat system and processed for integration in the content of an ongoing instant messaging or chat session. Specifically, the application output can be included in the ongoing instant messaging or chat session, either as session processible text where individual instant messaging/chat clients are not configured to process a native data format for the application, or in a native data format where the instant messaging/chat clients are configured to process the native data format.

Figure 1:
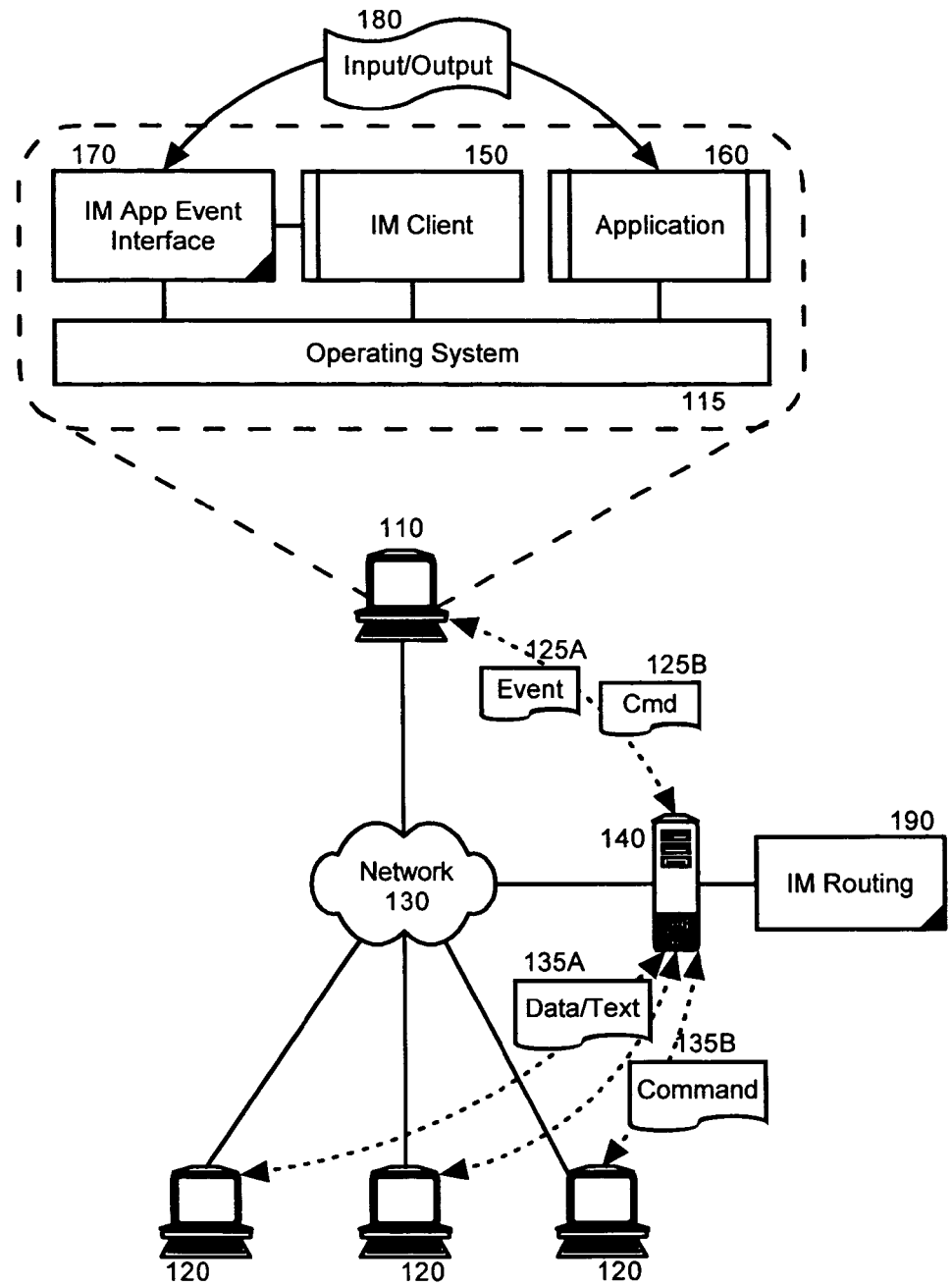
FIG. 1 is a schematic illustration of an instant messaging/chat system configured to integrate dynamically generated application input and output in an instant messaging/chat session.

In further illustration, FIG. 1 is a schematic illustration of an instant messaging/chat system configured to dynamically integrate application input and output in an instant messaging/chat session. The system can include one or more instant messaging/chat session clients 110, 120 communicatively coupled to one another over a data communications network 130. An instant messaging/chat server 140 further can be communicatively coupled to the instant messaging/chat session clients 110, 120 so as to facilitate instant messaging/chat communications between the instant messaging/chat session clients 110, 120.

In the instant messaging/chat session client 110, an operating system 115 can support the operation of an instant messaging client process 150. The instant messaging/chat client process 150 can provide a user interface (not shown) through which an end user can both view the content of an instant messaging/chat session, and also add content to the instant messaging/chat session. Notably, at least one instant messaging/chat session client 110 can be configured to dynamically integrate the input and output 180 of an application 160 in an instant messaging/chat session established between the instant messaging/chat session client 110 and at least one other instant messaging/chat session client 120.

In accordance with the present invention, input and output 180 to and from the application 160 can be provided to the instant messaging/chat client process 150 by way of an application programming interface (API) 170 to the instant messaging/chat client process. In this regard, the application 160 can be any application which can produce data output, including command-line applications, standalone applications, applets, and scripts. To that end, the API 170 can accept application input in the form of a command, and the API 170 can accept application output in a text format or a data format, such as an XML compliant markup language document. Subsequently, the API 170 can route application output as an event 125A to the instant messaging/chat server 140 over the data communications network 130. By comparison, the API 170 can route application input as a command 125B to the application 160.

More specifically, application commands can be embedded as chat messages in the instant messaging/chat session. Consequently, upon receiving a command 135B from one of the instant messaging/chat clients 120, an instant messaging/chat routing process 190 in the instant messaging/chat server 140 can route the command 135B as a textual command 125B to the instant messaging/chat client 110. The API 170 can detect the command 125B and can convert the command 125B into application input for processing by the application 160. In a preferred aspect of the invention, the API 170 can afford an opportunity to quash or modify the command 125B before passing the command 125B to the application 160.

The resulting application output similarly can be integrated into the instant messaging/chat session. More particularly, the application output can be converted by the API 170 into an event 125A which can be passed to an instant messaging/chat routing process 190. The instant messaging/chat routing process 190 can determine which of the instant messaging/chat clients 120 are to receive the event 125A and can forward a data/textual representation 135A of the event 125A to those instant messaging/chat clients 120.

Importantly, the instant messaging/chat routing process 190 can determine which of the instant messaging/chat clients 120 are to configured to process the event 125A in its data format, and which require a text format. For those instant messaging/chat clients 120 which are able to process the event 125A in a data format, no conversion process will be required. Otherwise, the instant messaging/chat routing process 190 can convert the event 125A into a textual representation for insertion into the content of the instant messaging/chat session.

Figure 2A:
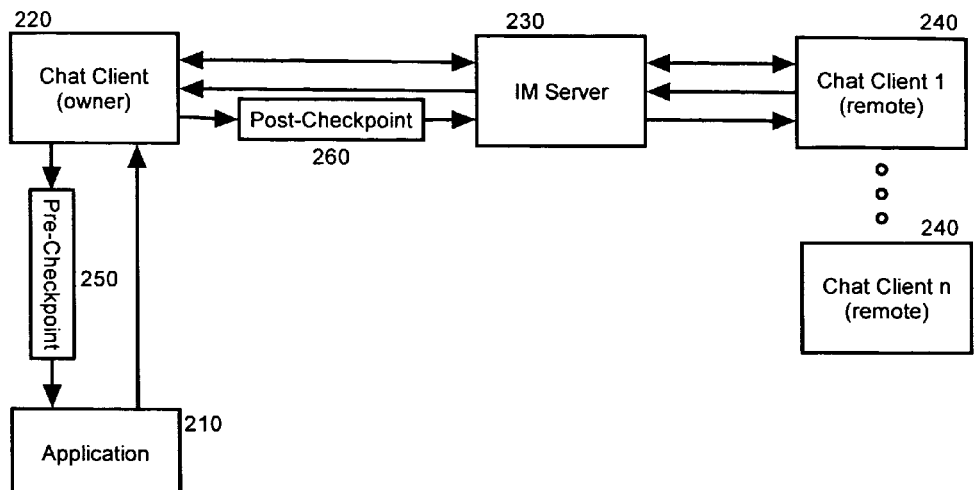
FIG. 2A is a block diagram of an instant messaging/chat system configured to dynamically integrate application input and output in an instant messaging/chat session.

Referring now specifically to the receipt and processing of application commands through an instant messaging/chat interface, FIG. 2A is a block diagram of an instant messaging/chat system configured to integrate dynamically generated application input and output in an instant messaging/chat session. In accordance with the present invention, a remote chat client 240 can issue an application command through an instant messaging/chat interface during the course of an instant messaging/chat session. The command can be distinguished from ordinary conversational text in that the command can be demarcated with a command indicia, whether visible or not, such as the "#" symbol as in "#[application command]".

The instant messaging/chat server 230 can receive the command and can route the command as any other conversational text in an instant messaging/chat session to the owning chat client 220 in the instant messaging/chat session. The owning chat client 220 can detect the presence of a command by locating the command indicia. Pre-processing 250 can be performed on the command, which can include modifying the attributes of the command, modifying the command itself, issuing a different command, or quashing the command. Subsequently, the command if not quashed can be passed to the application 210 for processing. Notably, the pre-processing can be manual or automatic in nature in that the user can intervene prior to the passing of the command to the application 210, or the intervention can be performed automatically in a programmatic fashion.

The output from the application 210 can be returned to the owning chat client 220 which can be post-processed 260 before being inserted into the instant messaging/chat session as ordinary conversational text. The output subsequently can be passed to the instant messaging/chat server 230 which can route the output to appropriately participating remote instant messaging/chat clients 240. In this way, even those remote instant messaging/chat clients 240 which did not issue the command can view the command and its results in the ordinary course of participating in the instant messaging/chat session.

Figure 2B:
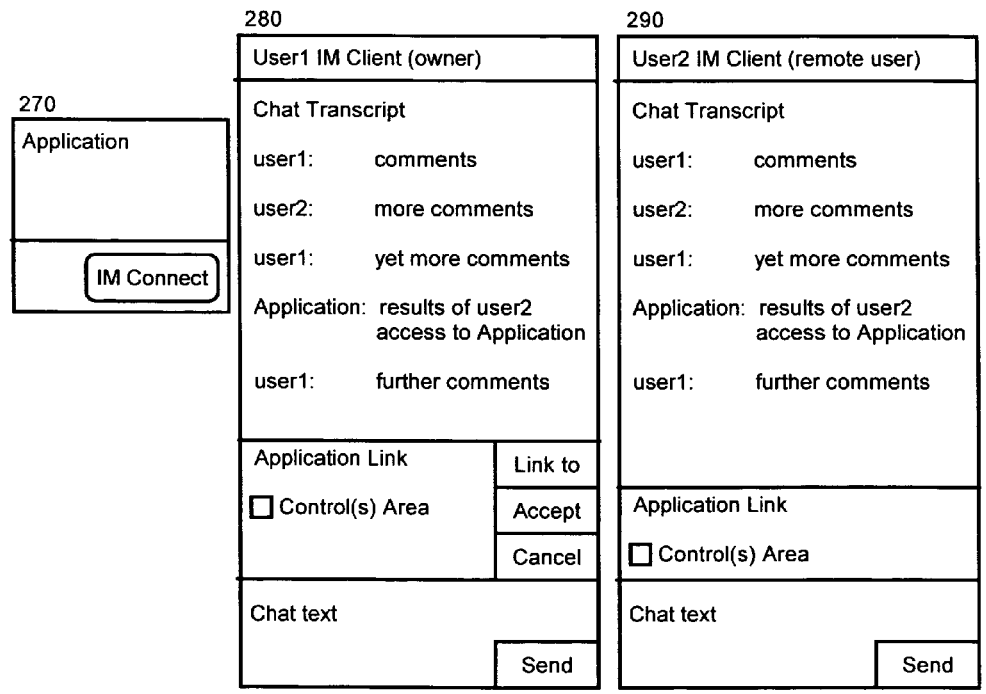
FIG. 2B is a pictorial illustration of a collective user interface configured to dynamically integrate application input and output in an instant messaging/chat session.

In further illustration, FIG. 2B is a pictorial illustration of a collective user interface configured to integrate dynamically generated application input and output in an instant messaging/chat session. The owning instant messaging/chat session client user interface 280 can permit the linking of an application to an active instant messaging/chat session. Upon activating the "Link To" control, an application and any of its controls can be integrated for interoperation with the active instant messaging/chat session. Alternatively, the application 270 can provide a user interface control for linking the application with the active instant messaging/chat session. Once linked, the output of the application can be inserted into the content of the instant messaging/chat session so that the remote instant messaging/chat session user interface 290 of each remote instant messaging/chat session client can view the application output.

Figure 3:
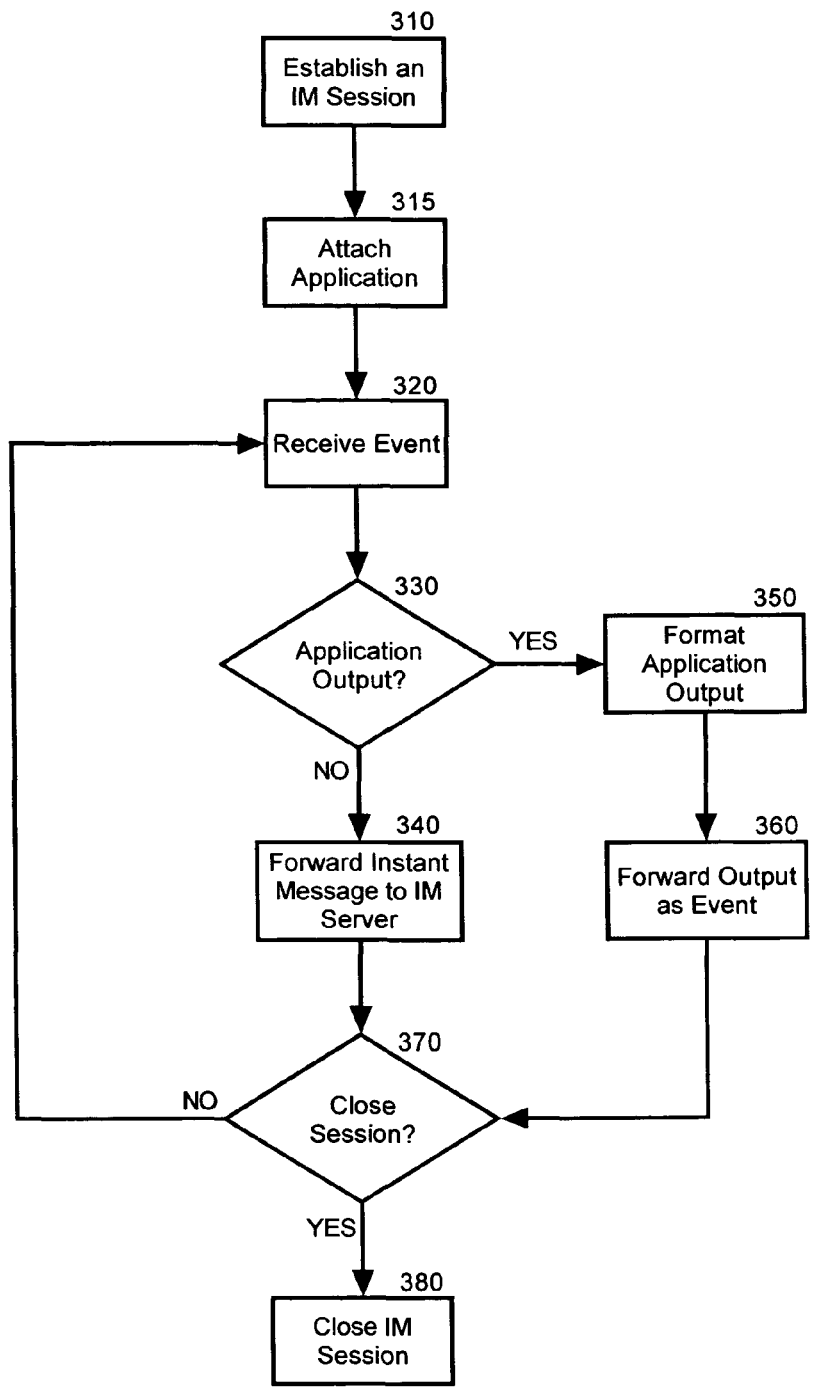
FIG. 3 is a flow chart illustrating a client-side process for dynamically integrating application input and output in an instant messaging/chat session in the instant messaging/chat system of FIG. 1; and, FIG. 4 is a flow chart illustrating a server-side process for dynamically integrating application input and output in an instant messaging/chat session in the instant messaging/chat system of FIG. 1.

As it will be apparent to the skilled artisan, the process of integrating dynamically generated application output into the content of an instant messaging/chat session can be bifurcated into a client-side sub-process and a server-side sub-process. In this regard, FIG. 3 is a flow chart illustrating a client-side process for integrating dynamically generated application input and output in an instant messaging/chat session in the instant messaging/chat system of FIG. 1. Beginning in block 310, an instant messaging/chat session can be established in which one or more other instant messaging/chat session clients participate in exchanging instant messaging/chat content in a collaborative manner. Subsequently, in block 315 an application can be attached to the established session such that the output of the application can be integrated into the content of the established session.

In block 320, an event can be received which event can be an instant message/chat posting or the output of the attached application, though the event also can include other information as it will be recognized by the skilled artisan. In decision block 330, it can be determined if the event contains application output 330. If so, in block 350 the application output can be formatted, for instance in an XML compliant markup language document. Subsequently, in block 360 the formatted output can be forwarded to the instant messaging/chat server as an event. If, on the other hand, the received event is not application output, the event can be forwarded in block 340 to the instant messaging/chat server presumably as instant messaging/chat content. In either case, if in decision block it is determined that the session is to be closed, in block 380 the session can be closed.

Figure 4:
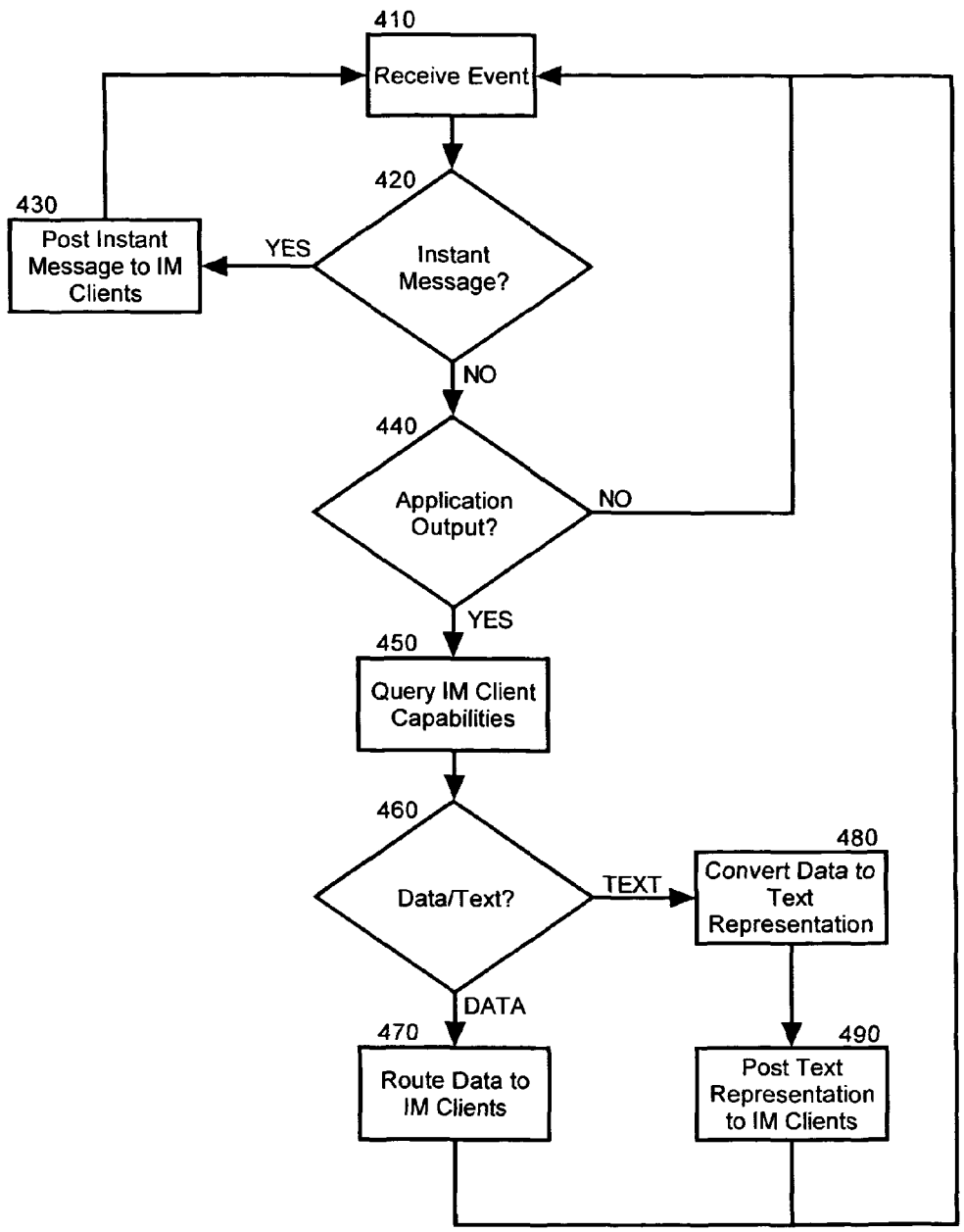

Turning now to the server-side process of FIG. 4, a flow chart is shown which illustrates a server-side process for integrating dynamically generated application input and output in an instant messaging/chat session in the instant messaging/chat system of FIG. 1. In block 410 an event can be received from a communicatively coupled instant messaging/chat client. In decision block 420, it can be determined whether the received event is instant messaging/chat content. If so, in block 430 the instant messaging/chat content can be posted to the ongoing instant messaging/chat session by forwarding the instant messaging/chat content to each instant messaging/chat client registered for the instant messaging/chat session.

If in decision block 420, it is determined that the received event is not instant messaging/chat content, in decision block 440 it can be determined if the received event is application output. If so, in block 450 each registered instant messaging/chat client can be queried to determine whether the instant messaging/chat client can process the application output in a (native) data format, or whether the output from the application must be provided as a textual representation (session processible text) able to be processed by the instant messaging/chat client just as if the application output were native instant messaging/chat content when the individual message client is not configured to process a native data format. In decision block 460, if no conversion is required, in block 470 the application output can be routed as data to the instant messaging/chat client. Otherwise, in block 480 the application output can be converted to a textual representation and in block 490 the textual representation can be posted to the instant messaging/chat client as if the application output were native instant messaging/chat content.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

I claim:
1. An instant messaging/chat system comprising:
an instant messaging/chat client;
an application event interface to said instant messaging/chat client, said interface having a configuration for receiving application input and output and integrating said received application input and output with instant messaging/chat content for an established instant messaging/chat session; and, an instant messaging/chat server configured for communicative coupling to said instant messaging/chat client, said server having logic for receiving application input from the instant messaging/chat client as a posting to the established instant messaging/chat session between instant messaging/chat clients, the application input is an application command distinguishable from conversational text, for forwarding said received application input to a designated external application, for receiving application output from said designated external application via a second instant messaging/chat client as instant messaging/chat content in said established instant messaging/chat session, for determining in said established instant messaging/chat session whether instant messaging/chat clients participating in said established instant messaging/chat session process said application output in a native data format and which of said instant messaging/chat clients process said application output only as a session processible textual representation, for converting said application output to said session processible textual representation for said instant messaging/chat clients determined to process said application output only as a session processible textual representation, while forwarding said application output in said native data format to instant messaging/chat clients determined to process said application output in a native data format, and for posting said converted application output as content in said established instant messaging/chat session for instant message/chat clients determined to process said application output only as a session processible textual representation.

2. The system of claim 1, wherein said instant messaging/chat client comprises logic for attaching an application to said established instant messaging/chat session so as to integrate input and output to and from said application into said instant messaging/chat content.

3. The system of claim 2, wherein said instant messaging/chat client comprises logic for pre-processing application input before forwarding said received application input to said designated external application.

4. The system of claim 2, wherein said instant messaging/chat client comprises logic for post-processing application output before integrating said output into said instant messaging/chat content.

5. The system of claim 1, wherein said configuration for receiving application output comprises logic for processing XML formatted application output.

6. A method for integrating dynamically produced application input and output into instant messaging/chat content in an established instant messaging/chat session, the method comprising the steps of:

receiving application input from a remote instant messaging/chat client as a posting to the established instant messaging/chat session between instant messaging/chat clients, the application input is an application command distinguishable from conversational text;

forwarding said received application input to a designated external application;

receiving application output from said designated external application via a second remote instant messaging/chat client as content in said established instant messaging/chat session;

determining in said established instant messaging/chat session which instant messaging/chat clients participating in said established instant messaging/chat session process said application output in a native data format and which of said instant messaging/chat clients process said application output only as a session processible textual representation;

converting said application output to said session processible textual representation for said instant messaging/chat clients determined to process said application output only as a session processible textual representation, while forwarding said application output in said native data format to instant messaging/chat clients determined to process said application output in a native data format; and, posting said converted application output as content in said established instant messaging/chat session for instant message/chat clients determined to process said application output only as a session processible textual representation.

7. The method of claim 6, further comprising the step pre-processing said application input before forwarding said received application input to the designated external application.

8. The method of claim 6, further comprising the step post-processing said application output before performing said posting step.

9. The method of claim 6, wherein said posting step comprises the steps of:

formatting said application output in an XML format and providing said formatted application output to said instant messaging/chat client through an application programming interface; and, providing said formatted application output as an encapsulated event to an instant messaging/chat server for distribution to instant messaging/chat clients participating in said established instant messaging/chat session.

10. The method of claim 6, wherein said posting step comprises the steps of:

encapsulating said application output into an event; and, forwarding said event to an instant messaging/chat server for distribution to instant messaging/chat clients participating in said established instant messaging/chat session.

11. The method of claim 6, wherein said application output is an XML compliant markup language document.

12. A machine readable storage device having stored thereon a computer program for integrating dynamically produced application input and output into instant messaging/chat content in an established instant messaging/chat session, the computer program comprising a routine set of instructions which when executed by a machine cause the machine to perform the steps of:

receiving application input from a remote instant messaging/chat client as a posting to the established instant messaging/chat session between instant messaging/chat clients, the application input is an application command distinguishable from conversational text;

forwarding said received application input to a designated external application;

receiving application output from said designated external application via a second remote instant messaging/chat client as content in said established instant messaging/chat session;

determining in said established instant messaging/chat session which instant messaging/chat clients participating in said established instant messaging/chat session process said application output in a native data format and which of said instant messaging/chat clients process said application output only as a session processible textual representation;

converting said application output to said session processible textual representation for said instant messaging/chat clients determined to process said application output only as a session processible textual representation, while forwarding said application output in said native data format to instant messaging/chat clients determined to process said application output in a native data format; and, posting said converted application output as content in said established instant messaging/chat session for instant message/chat clients determined to process said application output only as a session processible textual representation.

13. The machine readable storage device of claim 12, further comprising a routine set of instructions for causing the machine to further perform the step of pre-processing said application input before forwarding said received application input to the designated external application.

14. The machine readable storage device of claim 12, further comprising a routine set of instructions for causing the machine to further perform the step post-processing said application output before performing said posting step.

15. The machine readable storage device of claim 12, wherein said posting step comprises the steps of:

formatting said application output in an XML format and providing said formatted application output to said instant messaging/chat client through an application programming interface; and, providing said formatted application output as an encapsulated event to an instant messaging/chat server for distribution to instant messaging/chat clients participating in said established instant messaging/chat session.

16. The machine readable storage device of claim 12, wherein said posting step comprises the steps of:

encapsulating said application output into an event; and, forwarding said event to an instant messaging/chat server for distribution to instant messaging/chat clients participating in said established instant messaging/chat session.

17. The machine readable storage device of claim 12, wherein said application output is expressed in an XML compliant markup language document.

\* \* \* \* \*